United States Patent [19]

Hernqvist

[11] 4,157,253

[45] Jun. 5, 1979

[54] METHOD OF REDUCING ABSORPTION LOSSES IN FUSED QUARTZ AND FUSED SILICA OPTICAL FIBERS

[75] Inventor: Karl G. Hernqvist, Princeton, N.J.

[73] Assignee: RCA Corporation, New York, N.Y.

[21] Appl. No.: 918,655

[22] Filed: Jun. 23, 1978

[51] Int. Cl.² .............................................. C03B 37/00
[52] U.S. Cl. ........................................ 65/2; 65/30 R; 65/32; 65/DIG. 7; 250/504
[58] Field of Search .................... 65/2, 30 R, DIG. 7, 65/32; 250/504; 134/1

[56] References Cited

U.S. PATENT DOCUMENTS

| 3,788,827 | 1/1974 | De Luca | 65/32 X |
| 3,836,347 | 9/1974 | Ono et al. | 65/2 |
| 3,865,564 | 2/1975 | Jaeger et al. | 65/2 |
| 4,028,080 | 6/1977 | Di Vita | 65/2 |
| 4,028,135 | 6/1977 | Vig et al. | 134/1 |

FOREIGN PATENT DOCUMENTS 1003974  9/1965  United Kingdom ........................ 65/32

OTHER PUBLICATIONS

"Borosilicate Clad Fused Silica Core Fiber Optical Waveguide ... Process" Dabby et al. Appl. Phys. Lett., vol. 25 #12 12/15/1974 pp. 714, 715.
"Electric Discharge Lamps" H. Cotton p. 184 Chapman and Hall 1946.
"Drawing Induced Defect Centers in a Fused Silica Core Fiber" Friebele et al. Appl Physics Lett. vol. 28 #9, 5/1976 pp. 516–518.
"Surface Cleaning by Ultraviolet Radiation" Vac. Sci Techn. vol. 11 #1, Jan., Feb. 1974 pp. 474, 475.

Primary Examiner—Robert L. Lindsay, Jr.
Attorney, Agent, or Firm—Birgit E. Morris; A. Stephen Zaveli

[57] ABSTRACT

A method of reducing the absorption losses in an optical fiber by irradiating the optical fiber with ultraviolet light at a reduced pressure and elevated temperature.

5 Claims, 1 Drawing Figure

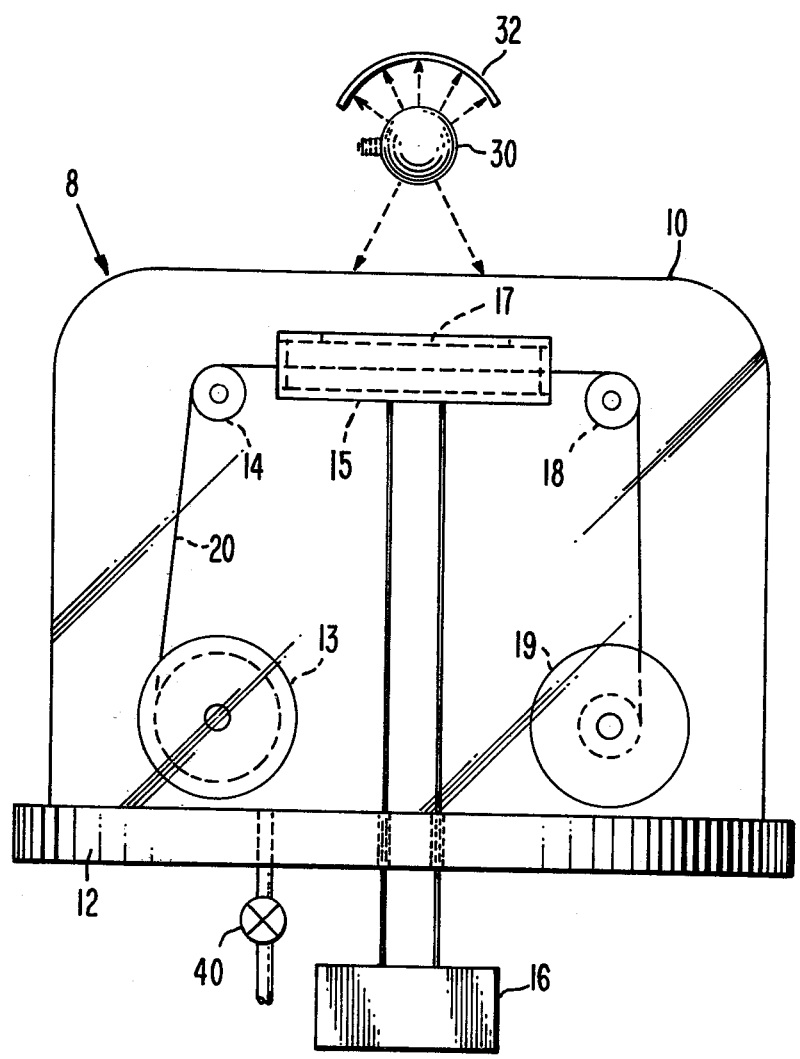

METHOD OF REDUCING ABSORPTION LOSSES IN FUSED QUARTZ AND FUSED SILICA OPTICAL FIBERS

This invention relates to optical fibers. More specifically, this invention relates to a method of reducing the absorption losses in optical fibers.

BACKGROUND OF THE INVENTION

Methods of making high purity, constant diameter optical glass fibers for telecommunications and other electronic applications are taught in U.S. Pat. No. 3,865,564 and U.S. Pat. No. 4,028,080. The purity of the fiber material is extremely important. Beam And Fiber Optics, p. 22, Academic Press, (1976), J. A. Arnaud teaches that contamination of the fiber by one part per million of hydroxyl radical (OH$^-$) impurity may result in absorption losses on the order of about 1 dB/kM. When fiber optics are employed in a system which requires the long distance transmission of information, it is extremely important to minimize the signal loss and thereby reduce the number of amplifiers needed to transmit a signal. Reducing the number of amplifiers in a system minimizes the cost of an optical fiber system.

Thus, it would be desirable to have a method which can dissociate the hydroxyl radicals present in quartz or in fused silica during fiber manufacturing operations to decrease the signal losses of the optical fiber and minimize the cost of fiber optic sytems.

SUMMARY OF THE INENTION

A method for reducing the absorption losses in an optical fiber by the irradiation of a heated fused quartz or fused silica optical fiber in a vacuum for a time sufficient to dissociate and outgas the hydroxyl radicals contained therein as hydrogen.

BRIEF DESCRIPTION OF THE DRAWING

The FIGURE is a cross-sectional view of an apparatus suitable for carrying out the method of my invention.

DETAILED DESCRIPTION OF THE INVENTION

The FIGURE shows an apparatus suitable for carrying out the method of my invention. A vacuum chamber 8 is defined by a vacuum glass jar 10 and base 12. A glass fiber supply spool 13, oven 15 and take up spool 19 are contained in the vacuum chamber 8. The quartz or fused silica fiber 20 is pulled from the fiber supply spool 13 over a roller 14 and through the oven 15 where it is heated to from about 500° C. to about 1500° C., preferably from about 900° C. to about 1200° C., and most preferably about 1000° C. The oven 15 is connected to any convenient power source 16 located outside the vacuum chamber 8. The heated fiber optic 20 is irradiated with ultraviolet radiation from a lamp 30 through a window 17 in the oven 15 for a sufficient time to dissociate the hydroxyl radicals contained in the optical fiber. The high temperature allows the freed hydrogen to rapidly diffuse to the surface of the fiber and be pumped away by the vacuum pump. Reflector 32 maximizes the ultraviolet radiation impinging on the optical fiber 20. After the dissociation of the hydroxyl radicals, the optical fiber passes over roller 18 and onto the take up spool 19. The chamber 8 is evacuated by outlet 40 which is connected to any suitable vacuum pump capable of evacuating vacuum jar 10 and base 12 to a pressure of about $1\times10^{-2}$ to about $1\times10^{-10}$ torr and preferably about $1\times10^{-5}$ torr to about $1\times10^{-8}$ torr. The dissociated hydroxyl radicals in the form of hydrogen gas are removed from the system by the vacuum pump.

The dissociation of the hydroxyl radical as hydrogen gas was verified by a mass spectrometer. A fused quartz vessel, with a hydroxyl content of about 5 ppm, containing a mercury discharge to generate UV was evacuated and filled with 30 torr of argon gas. The mercury discharge was operated inside the fused quartz vessel for 10 hours, with the fused quartz vessel at about 1000° C. on the inside and about 200° C. on the outside. Thereafter, the vessel was mechanically broken inside the chamber of a mass-spectrometer and the gas content analyzed. The mass-spectrometer indicated that hydrogen gas was present in an amount of about 1% of the argon pressure or about 0.3 torr. The hydrogen accumulated inside the vessel is equivalent to a dissociation of about 0.2 ppm hydrogen from the original vessel content of about 5 ppm. the ultraviolet The effective wavelength range of the ultraviolet radiation necessary for dissociation is from about 3000 to about 4000 angstroms. The intensity of dissociation of the hydroxyl radical is not accurately known, but studies of this process indicate that a radiation intensity of about 100 watts allow the processing of an optical fiber at reasonable speeds. The greater the wattage of the ulraviolet radiation the more quickly and completely will be the dissociation of the hydroxyl radicals.

For the efficient processing of the optical fiber, sufficient time must be allowed for the dissociation of the hydroxyl radicals and the outgassing of the freed hydrogen to prevent recombination.

The outgassing rate of the freed hydrogen is determined by the characteristic diffusion time. For outgassing hydrogen from a circular fiber optic of radius (R), this time is equivalent to $\tau=R^2/\pi^2 D$ where D is equal to the diffusion constant. The diffusion constant of hydrogen in quartz is estimated to be between about $16.7\times10^{-7}$ to about $16.7\times10^{-8}$ cm$^2$/sec. Thus, for a typical optical fiber wherein R is $5\times10^{-3}$ cm, 150 to 1500 seconds should be sufficient to reduce the hydrogen density to about one-third of its initial value. In order to reduce the hydrogen concentration to about one-tenth of its initial value, heating and ultraviolet irradiation should continue for about 1 hour in a vacuum at 1000° C.

As an illustration, the method is carried out according to the following procedure: an optical fiber with a radius of about $5\times10^{-3}$ cm coiled on a supply spool is passed through an oven and attached to a take up spool in a vacuum jar. The vacuum jar is then evacuated to a pressure of about $1\times10^{-7}$ torr and the oven is heated to about 1000° C. A 100 watt high intensity ultraviolet lamp emitting ultraviolet radiation from about 3000 to about 4000 angstroms wavelength is focussed on the fiber optic. The take up spool is turned so as to permit the ultraviolet radiation to irradiate the heated optical fiber for about 10 minutes to dissociate the hydroxyl radicals contained therein.

While particular embodiments of the present invention have been shown and described in connection with the preferred embodiments, various modifications may be made in the invention without departing from the spirit thereof or the scope of the appended claims, as can be appreciated by those skilled in the art.

I claim:

1. A method of reducing absorption losses in an optical fiber comprising:

heating an optical fiber selected from the group consisting of fused quartz and fused silica, to from about 500° C. to about 1500° C. under a pressure of from about $1 \times 10^{-2}$ to about $1 \times 10^{-10}$ torr; and irradiating said optical fiber with ultraviolet radiation in the wavelength range of from about 3000 to about 4000 angstroms for a sufficient time to dissociate the hydroxyl radicals contained in the optical fiber.

2. A method according to claim 1 wherein the temperature is from about 900° C. to about 1200° C.

3. A method according to claim 2 wherein the temperature is about 1000° C.

4. A method according to claim 1 wherein the vacuum is about $1 \times 10^{-5}$ torr to about $1 \times 10^{-8}$ torr.

5. A method according to claim 1 wherein the optical fiber is irradiated with ultraviolet radiation for from about 150 seconds to about 1 hour.

* * * * *